United States Patent [19]

Pere

[11] 4,294,683

[45] Oct. 13, 1981

[54] ELECTROLYSIS UNIT

[75] Inventor: Gêrard Peré, Le Breuil, France

[73] Assignee: Creusot-Loire, Paris, France

[21] Appl. No.: 136,099

[22] Filed: Mar. 31, 1980

[30] Foreign Application Priority Data

Apr. 2, 1979 [FR] France ................... 79 08694

[51] Int. Cl.³ .................. C25B 9/00; C25B 15/08
[52] U.S. Cl. ........................... 204/258; 204/266
[58] Field of Search .......... 204/263, 266, 229, 230, 204/129, 258

[56] References Cited

U.S. PATENT DOCUMENTS

| | | | |
|---|---|---|---|
| 1,172,886 | 2/1916 | Halter | 204/230 |
| 2,695,874 | 11/1954 | Zdansky | 204/258 |
| 4,039,421 | 8/1977 | Mas | 204/266 |

*Primary Examiner*—T. M. Tufariello
*Attorney, Agent, or Firm*—Haseltine & Lake

[57] ABSTRACT

Electrolysis unit such as a unit, for producing hydrogen and oxygen industrially by the electrolysis of water under pressure, includes a flow regulating apparatus (49) in each of the circuits (24, 23) connecting the anolyte and catholyte outlets (20, 21) of the electrolyzer (19) to the degassers (25, 34), and a flow-control apparatus (49) ensuring concomitant variations in the anolyte flow and catholyte flow.

10 Claims, 5 Drawing Figures

4,294,683

ELECTROLYSIS UNIT

BACKGROUND OF THE INVENTION

The present invention concerns an electrolysis unit, such as a unit for producing hydrogen and oxygen industrially by the electrolysis of water under pressure.

The electrolyzers with which this sort of unit is equipped are provided with diaphragms for separating the anolyte and catholyte circuits in each electrolysis cell. These diaphragms, generally made of asbestos or nickel rep, are light, relatively porous and of low mechanical resistance. A difference in pressure appearing between the anolyte and catholyte circuits, and consequently on either side of each diaphragm, can cause cracks in these diaphragms. These cracks, associated with the normal porosity of these diaphragms, can cause gases to pass from one compartment to the other, and the higher the pressure and temperature, the more explosive the mixtures formed.

It is therefore essential to provide electrolysis units, and particularly those working under great pressures and high temperatures, with regulating apparatuses for avoiding differences in the pressure on either side of the diaphragms.

SUMMARY OF THE INVENTION

The electrolysis unit in conformance with the invention is of the type comprising conventionally at least one electrolyzer provided with at least one anolyte outlet and at least one catholyte outlet, each of the said outlets being connected to a respective degasser, and is equipped with regulating means allowing differences in the pressure on either side of the diaphragms with which the electrolyzer is equipped to be avoided in a particularly simple and effective way. It is characterised in that it also includes, in each of the circuits connecting the said outlets to their respective degassers, an apparatus for controlling the flow of electrolyte, each apparatus for controlling the flow of anolyte being coupled to the corresponding apparatus for controlling the flow of catholyte, and vice versa, by a connection producing concomitant variations in these two flow-control apparatuses.

BRIEF DESCRIPTION OF THE DRAWINGS

The invention will be better understood with the help of the following description of some non-limiting embodiments, with reference to the attached drawings in which.

DESCRIPTION OF THE PREFERRED EMBODIMENTS

Figure 1:
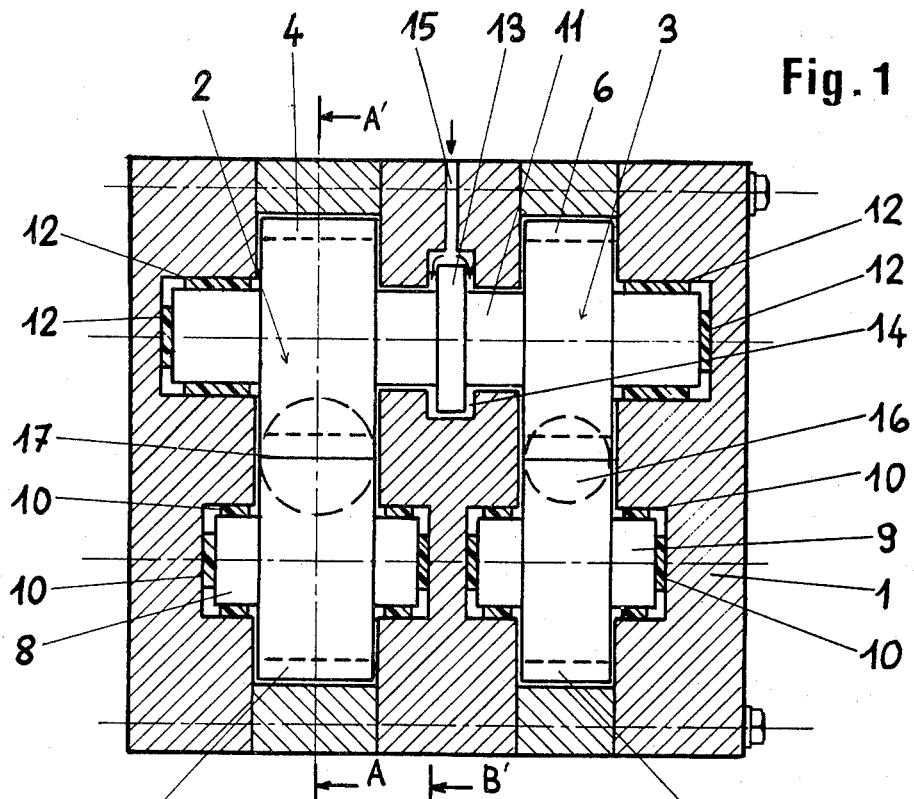
FIGS. 1 and 2 represent diagrammatically an embodiment of an apparatus for regulating the flow of electrolyte intended to equip an electrolysis unit in conformance with the invention, FIG. 1 being a section at the line BB' of FIG. 2, and FIG. 2 a section at the line AA' of FIG. 1.
Figure 2:
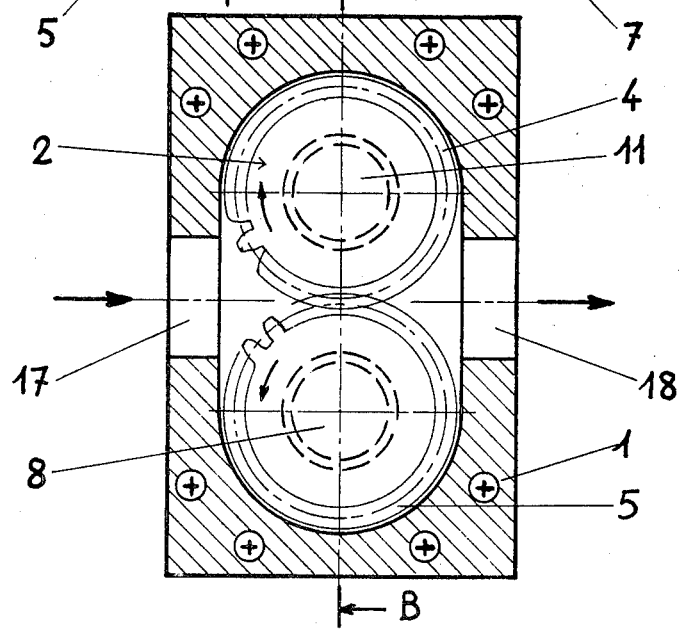

With reference first to both FIGS. 1 and 2, the apparatus for regulating the flow of electrolyte represented comprises, enclosed in a common housing 1, two positive displacement apparatuses (2, 3) for flow control, each constituted by two toothed wheels (4, 5 and 6, 7) meshing with one another like toothed wheels equipping positive displacement gear pumps. The lower wheels (5, 7) are each mounted free on independent shafts (8, 9), each mounted on bearing rings 10, made of polytetrafluoroethylene, for example. The upper wheels (2, 3) are mounted on one and the same shaft 11 itself borne by bearing rings 12 of polytetrafluoroethylene. The shaft 11 is provided at the middle with a flange 13, the part of the shaft 11 located between the wheels 2 and 3 as well as the said flange 13 being positioned in a chamber 14 connected externally via a water inlet 15 to ensure sealing between the anolyte and catholyte circuits. The electrolyte enters the lower part of the housing 1 via respective inlets (17, 16) for the catholyte and the anolyte, and also leaves at the upper part of the said housing 1 via respective outlets such as the outlet 18 shown in FIG. 2. In addition, as seen in FIG. 1, the toothed wheels are of different thicknesses for each of the two electrolyte circuits, and are adjusted according to the ratio of the flow rates required in these two circuits; for example, they have the ratio ($\frac{2}{3}$, $\frac{1}{3}$) in the case of electrolysis of water.

As the drawings show, the assembly 2 forms a positive displacement apparatus for controlling the flow of catholyte, while the assembly 3 forms a positive displacement apparatus for controlling the flow of anolyte. As the apparatuses 2 and 3 are mechanically coupled by the shaft 11, any variation of flow in the assembly 2 produces a variation in flow of the same ratio in the assembly 3 and vice versa so that if the pressures in the anolyte and catholyte circuits are the same at the beginning, any variation in pressure in one of these circuits will produce the same variation of pressure in the other circuit, and consequently no difference in pressure between the two will ever appear.

The regulator of FIGS. 1 and 2 can also be used as a positive displacement pump without losing its regulating functions. For this, the shaft 11 only has to be coupled to a motor outside the housing 1, as will be explained hereinafter with reference to FIG. 4.

Figure 3:
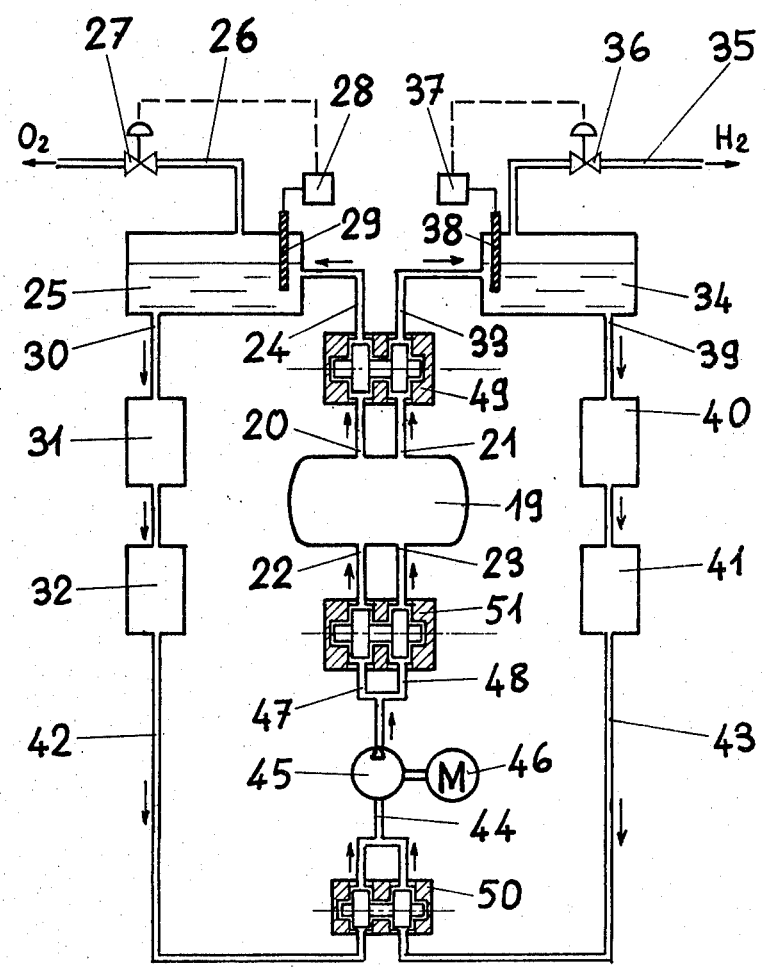
FIG. 3 represents diagrammatically a first embodiment of an electrolysis unit in conformance with the invention.

In FIG. 3 which represents diagrammatically a unit for electrolysis of water under pressure in conformance with the invention, the unit is equipped with the electrolyzer indicated by the reference 19 which is conventionally provided with an anolyte outlet 20, and a catholyte outlet 21, as well as with an inlet 22 for electrolyte intended for the anodic compartments and with an inlet 23 for electrolyte intended for the cathodic compartments.

Also conventionally, the anolyte issuing at 20 is brought through a circuit 24 to an anolyte degasser 25 from which the oxygen is extracted through a gas outlet conduit 26. In the conduit 26 a valve 27 is positioned whose aperture is controlled by a level transducer 28 connected to a probe 29 positioned in the degasser: thus, in a way known per se, a level of electrolyte kept between two given limits is ensured in the degasser. Also conventionally, the degassed anolyte is extracted from the degasser 25 via an outlet 30, and passes into a cooling circuit 31 and a filter 32.

Similarly, and in a symmetrical manner, the catholyte leaving the electrolyzer 19 at 21 passes successively into a connecting circuit 33, and a catholyte degasser 34, itself provided with a hydrogen outlet conduit 35 and with a value 36 controlled by a level transducer 37 connected to a probe 38, and then leaves the degasser 34 via the outlet 39, and passes through the cooling circuit 40 and the filter 41. Finally, also conventionally, the two electrolyte circuits (42, 43) issuing from the filters 32 and 41 are connected together at a single conduit 44 so as to obtain the initial concentration of potash for the electrolyte. The electrolyte then passes into a centrifugal pump 45 driven by a motor 46 and is then again separated into two circuits 48 and 47 whose conduits have sections in the ratio ($\frac{2}{3}$, $\frac{1}{3}$) required for the inlets 23 and 22 to the electrolyzer 19.

In conformance with the invention, a flow regulating apparatus 49 as previously described with reference to FIGS. 1 and 2 is positioned on the circuits 24 and 33 between the electrolyzer 19 and the degassers 25 and 34. The regulator 49 allows concomitant variations in flow to be obtained for the anolyte and catholyte so that no difference in pressure between the compartments of the electrolysis cells of the electrolyzer 19 and therefore no mechanical stress on the diaphragms equipping these cells ever occurs.

In addition, according to a further advantageous characteristic of the invention, the return circuits 42 and 43 are connected together to become one at 44 through a regulator 50 identical to the regulator 49, which serves to suppress the differences in pressure which can appear in the said return circuits because of different clogging of the filters 32 and 41. In addition, and equally advantageously, a third regulator 51 identical to the two previous is positioned in the distribution conduits 47 and 48 and serves to ensure good distribution of electrolyte as well as to steady its flow.

Finally, the three regulators 49, 50 and 51 each have an advantageous function in isolating the different circuits of the unit they separate: a variation occurring downstream of one of these will not be transmitted upstream of it. For example, a variation occurring in the degassers 25 and/or 34 will not be passed on to the electrolyzer 19. Similarly, the distributor 51 allows the pump 45 of the electrolyzer 19 to be isolated and the distributor 50 allows the circuit 44 connecting the return circuits 42 and 43 together to be isolated.

Figure 4:
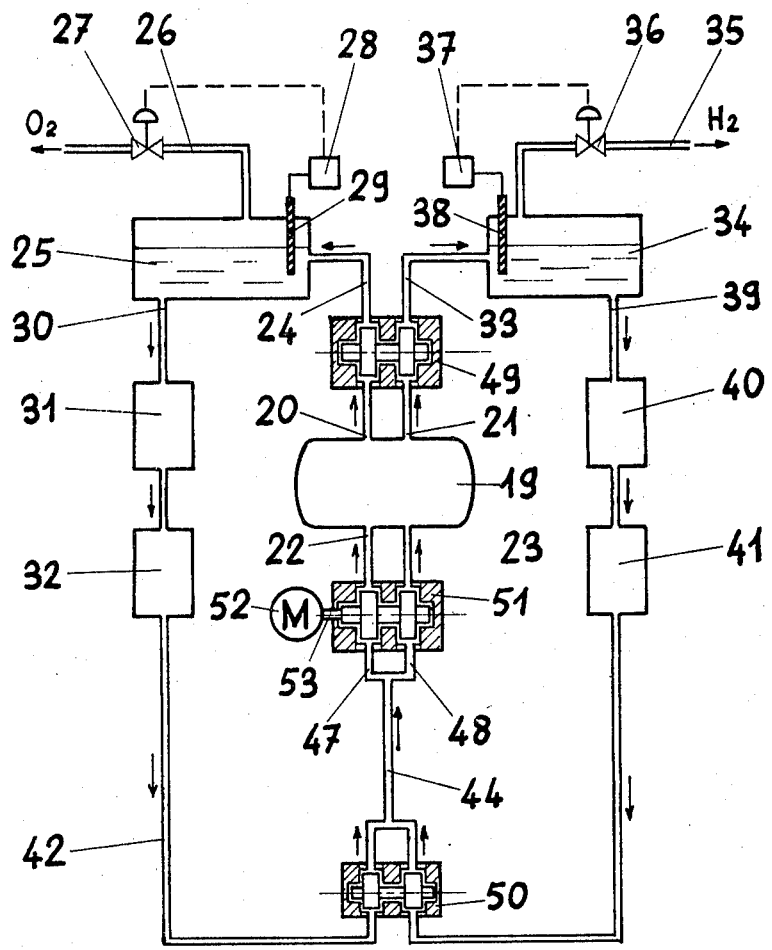
FIG. 4 represents diagrammatically a second embodiment of an electrolysis unit in conformance with the invention.

FIG. 4 represents diagrammatically an electrolysis unit of the type previously described with reference to FIG. 3. However, the pumping function is ensured by the regulator 51 itself, now coupled to a driving motor 52 by a mechanical connection 53 passing through its housing. In this embodiment, the pump 45 and its driving motor 46 can consequently be omitted to advantage.

Figure 5:
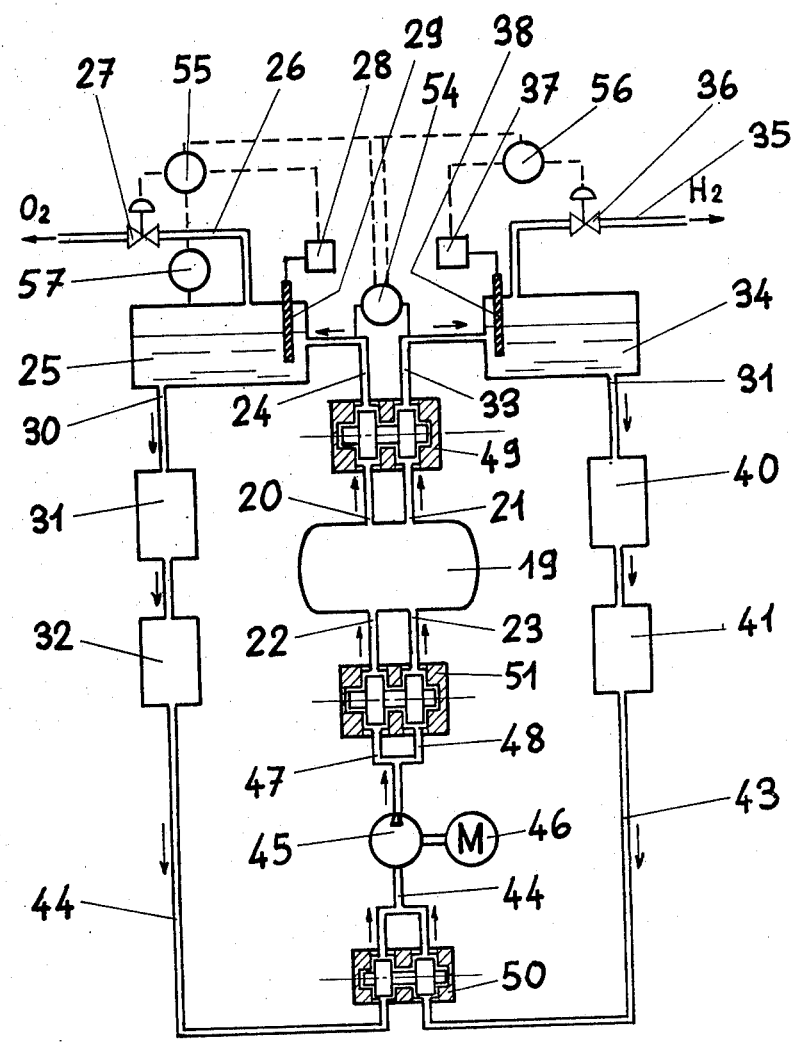
FIG. 5 represents diagrammatically a variant of embodiment of the electrolysis unit of FIG. 3.

FIG. 5 represents diagrammatically a variant of the electrolysis unit of FIG. 3, provided, in relation to the latter, with additional conventional regulating apparatuses allowing safety to be ensured and improving the pressure regulation of the assembly. With this object, the circuits 24 and 33 are connected to a differential pressure transducer 54. The differential transducer 54 is connected to the valves 27 and 36 in the same way as the level transducers 28 and 37, through signal selectors 55 and 56 working as "OR" circuits and acting on the opening and closing of these. In addition, and also conventionally, a pressure transducer 57 is connected to the degasser 25 and also acts on the valve 27 through the selector 55. The action of the pressure transducer 57 is passed on to the degasser 34 through the regulator 49 of the invention.

The mechanical regulators (49, 50, 51) with which units in conformance with the invention are equipped can be advantageously used for measurement also and if need be for safety. It is in fact easy to measure flow rates of electrolyte simply and thus follow the development of the yield of the electrolyser, by taking the speed of rotation of the shafts of the toothed wheels.

In addition, it is possible to ensure safety by positioning several regulators of the invention in parallel in the same circuit: if one of the regulators jams, the speed of the others will increase, which allows the breakdown to be detected without there having been any interruption of the circuit.

The invention is used in the field of the industrial production of hydrogen and oxygen by the electrolysis of water under pressure.

I claim:

1. Electrolysis unit comprising at least one electrolyzer provided with at least one anolyte outlet and at least one catholyte outlet, a degasser for each of said outlets, a circuit connecting each degasser to its respective outlet, means for controlling the flow of electrolyte in each connecting circuit means, each for controlling the flow of anolyte being coupled to the corresponding means for controlling the flow of catholyte, and vice versa, by a coupling connection producing concomitant variations in these two flow-control means and an electrolyte return circuit leading from each degasser, said return circuits being connected together at a point upstream of the electrolyzer.

2. Electrolysis unit according to claim 1, wherein said coupling connection is a mechanical connection.

3. Electrolysis unit according to claim 2, wherein each of the said flow-control means includes at least one rotating element, and in that the said coupling connection is effected by at least one shaft common to the two corresponding rotating elements of each flow-control means.

4. Electrolysis unit according to claim 3, wherein each of the said flow-control wherein includes at least two toothed wheels meshing with one another and in that the said mechanical connection is constituted by at least one shaft common to the corresponding wheels of the means for controlling the flow of anolyte and of the means for controlling the flow of catholyte.

5. Electrolysis unit according to claim 1 wherein the electrolyte return circuits for returning electrolyte from the degassers to the electrolyzer are equipped with at least one regulating apparatus including second flow-control means in each of the electrolyte circuits located at the anolyte side and the catholyte side respectively, these two second flow control means being coupled by a connection producing concomitant variations of these.

6. Electrolysis unit according to claim 5, wherein in that at least one of the said regulating apparatuses is positioned at the inlet of the electrolyzer.

7. Electrolysis unit according to claim 5, wherein at least one of the said regulating apparatuses is positioned upstream of the point at which the return circuits from the respective degassers are connected together.

8. Electrolysis unit according to claim 6, wherein the electrolyte circulating pump with which the said unit is equipped is positioned at the inlet of the said regulating apparatus itself located at the inlet of the electrolyzer.

9. Electrolysis unit according to claim 1, wherein at least one of the said flow-control means is also coupled to a driving motor.

10. Electrolysis unit according to claim 5, wherein at least one of the said regulating apparatuses with which the electrolyte return circuits are equipped is identical to the regulating circuit with which the circuit connecting the electrolyzer to the degasser is equipped.

* * * * *